United States Patent [19]

Ojakaar

[11] Patent Number: 4,613,636
[45] Date of Patent: * Sep. 23, 1986

[54] PEROXIDE-CURABLE BROMINATED FLUOROELASTOMER COMPOSITION CONTAINING AN N,N,N',N'-TETRASUBSTITUTED 1,8-DIAMINONAPHTHALENE

[75] Inventor: Leo Ojakaar, Hockessin, Del.

[73] Assignee: E. I. Du Pont de Nemours and Company, Wilmington, Del.

[ * ] Notice: The portion of the term of this patent subsequent to Jul. 16, 2002 has been disclaimed.

[21] Appl. No.: 754,499

[22] Filed: Jul. 12, 1985

[51] Int. Cl.$^4$ .................... C08K 5/18; C08F 8/32
[52] U.S. Cl. .................... 524/83; 524/89; 524/92; 524/93; 524/95; 524/96; 524/97; 524/247; 524/252; 524/256; 524/544; 524/546; 524/746; 524/752; 525/326.3; 525/382
[58] Field of Search .................... 524/83, 89, 92, 93, 524/95–97, 746, 247, 752, 252, 544, 546, 256; 525/326.3, 382

[56] References Cited

U.S. PATENT DOCUMENTS 4,529,759 7/1985 Ojakaar .................... 524/83

Primary Examiner—Herbert J. Lilling

[57] ABSTRACT

A peroxide-curable fluoroelastomer composition which can be readily removed from a mold cavity without tearing which comprises a fluoroelastomer whose interpolymerized units consist essentially of units of tetrafluoroethylene, units of perfluoroalkyl perfluorovinyl ether, units of a bromine-containing olefin and, optionally, units of ethylene, and from about 0.05–2 parts per 100 parts fluoroelastomer of an N,N,N',N'-tetrasubstituted 1,8-diaminonaphthalene having the formula:

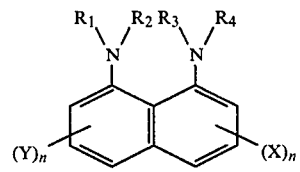

wherein $R_1$, $R_2$, $R_3$ and $R_4$ are independently alkyl groups of 1–6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6–20 carbon atoms in which a carbon atom can be replaced by an oxygen or a sulfur atom, X and Y are independently an alkyl group or an alkoxy group containing 1–4 carbon atoms and n is 0–3.

13 Claims, No Drawings

PEROXIDE-CURABLE BROMINATED FLUOROELASTOMER COMPOSITION CONTAINING AN N,N,N',N'-TETRASUBSTITUTED 1,8-DIAMINONAPHTHALENE

BACKGROUND OF THE INVENTION

This invention is directed to certain peroxide-curable tetrafluoroethylene-containing brominated fluoroelastomer compositions that contain N,N,N',N'-tetrasubstituted 1,8-diaminonaphthalenes that function as mold release agents and do not detrimentally affect the physical properties of the polymer.

When cured with peroxides tetrafluoroethylene-containing fluoroelastomers that contain units derived from brominated olefins have good resistance to damage by heat, solvents and corrosive chemicals and they are characterized by being especially resistant to degradation by steam and strong bases. However, the manufacture of molded products made from these polymers presents a serious problem because, in spite of the fact that mold release agents are sprayed on the mold cavity or incorporated in the polymer, the vulcanizates tenaciously adhere to the walls of the mold cavity and, consequently, the shaped article is frequently torn or damaged when removed from the mold. Also, the incorporation of a mold release agent into the polymer can, and usually does, have serious adverse effects on the physical properties of the vulcanizate, for example, Mooney Scorch and compression set, which can restrict the successful commercial use of the polymer. Deposits of polymer on the mold cavity surface and poor release of the shaped vulcanizate from the mold are major reasons for rejecting the shaped article which, of course, adds to the expense of manufacture of such molded articles. The present invention provides a peroxide-curable tetrafluoroethylene-containing fluoroelastomer composition containing aromatic diamines which are N,N,N',N'-tetrasubstituted 1,8-diaminonaphthalenes. These compositions do not stick to the metal mold cavity and tear when ejected or removed from the mold cavity while, at the same time, the incorporation of the aromatic diamine into the polymer does not detrimentally affect its important physical properties such as compression set resistance, elongation at break and tensile strength.

SUMMMARY OF THE INVENTION

The present invention is directed to a peroxide-curable fluoroelastomer composition which comprises:

(a) a fluoroelastomer whose interpolymerized units consist essentially of units of tetrafluoroethylene, units of perfluoroalkyl perfluorovinyl ether, units of a bromine-containing olefin and, optionally, units of ethylene, and (b) from about 0.05–2 parts per 100 parts fluoroelastomer of an N,N,N',N'-tetrasubstituted 1,8-diaminonaphthalene having the formula:

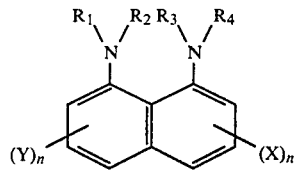

where $R_1$, $R_2$, $R_3$ and $R_4$ are independently alkyl groups of 1–6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6–20 carbon atoms in which a carbon atom can be replaced by an oxygen or a sulfur atom, X and Y are independently an alkyl group or an alkoxy group containing 1–4 carbon atoms and n is 0–3.

When the tetrafluoroethylene-containing fluoroelastomer composition that contains the aromatic diamine, N,N,N',N'-tetrasubstituted 1,8-diaminonaphthalene, is peroxide-cured and shaped in a mold cavity, upon completion of the process it is readily ejected or removed from the mold cavity without tearing or damage due to adherence of the polymer to the walls of the mold cavity. Furthermore, the important physical properties of the vulcanizate are not substantially detrimentally affected due to the presence of the aromatic diamine. The resulting cured tetrafluoroethylene-containing fluoroelastomer compositions of the present invention can be used to make articles such as O-rings, hose, gaskets, shaft seals and the like.

DESCRIPTION OF PREFERRED EMBODIMENTS

When the peroxide-curable tetrafluoroethylene-containing fluoroelastomer having a bromine-containing olefin as a cure site has incorporated therein an N,N,N',N'-tetrasubstituted 1,8-diaminonaphthalene having the formula:

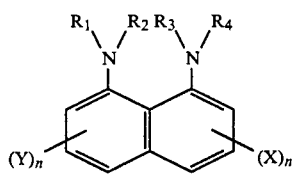

where $R_1$, $R_2$, $R_3$, $R_4$, X, Y and n have the values given above, the resulting fluoroelastomer composition when peroxide cured is easily removed from the mold cavity without damage and it retains substantially those important physical properties associated with such fluoroelastomers.

Although applicant does not wish to be limited by any theory concerning the invention, it is believed that the unusual basicity of the N,N,N',N'-tetrasubstituted 1,8-diaminonaphthalenes is due to the steric interaction of the two peri-substituted groups and this interaction is responsible for the activity of the aromatic diamines on the fluoroelastomer. The alignment and hybridization of the lone pairs of electrons on the nitrogen atoms determine to a large extent the properties of these N,N,N',N'-tetrasubstituted 1,8-diaminonaphthalenes. This explains the formation of a very strong N—H—N hydrogen bond in the monoprotonated form of the aromatic diamine. The strong basicity of these aromatic amines can be illustrated from a comparison of the basicity of 1,8-bis(dimethylamino)naphthalene, which has a pKa of 12.34, and a more typical aromatic amine, N,N-dimethylaniline, which has a pKa of 5.1.

The N,N,N'-tetrasubstituted 1,8-diaminonaphthalenes used in the present invention are either commercially available or can be prepared by alkylating 1,8-diaminonaphthalene with conventional alkylating agents. For example, 1,5-dimethylnaphtho[1,8-bc]-1,5-diazacycloalkanes can be synthesized by alkylation of 1,8-bis(methylamino)naphthalene with difunctional reagents such as dihalides. 1,8-bis(dimethylamino)naphthalene is the preferred aromatic diamine that is used in the present invention where $R_1$, $R_2$, $R_3$ and $R_4$ are methyl groups. This aromatic diamine is commercially available or it can be synthesized by reacting 1,8-diaminonaphthalene in tetrahydrofuran with excess dimethyl sulfate in the presence of sodium hydride. Procedures for synthesizing N,N,N',N'-tetrasubstituted 1,8-diaminonaphthalenes are further described by R. W. Alder et al., in the Journal of the Chemical Society, Perkin I, page 2840, 1981.

The N,N,N'-tetrasubstituted 1,8-diaminonaphthalenes used in the present invention can be divided into three categories represented generically by the following formula:

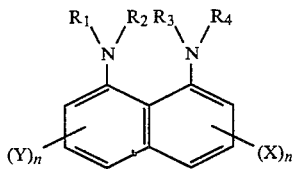

The first category includes N,N,N',N'-tetrasubstituted 1,8-diaminonaphthalenes in which $R_1$, $R_2$, $R_3$ and $R_4$ are independently alkyl groups of 1-6 carbon atoms, phenyl or benzyl. Representative compounds include 1,8-bis(diethylamino)naphthalene, 1-benzylmethylamino-8-dimethylaminonaphthalene, 1,8-bis(dimethylamino)-2,7-dimethoxynaphthalene, and 1,8-bis(diethylamino)-2,7-dimethoxynaphthalene. Preferably, $R_1$, $R_2$, $R_3$ and $R_4$ are independently alkyl groups of 1-6 carbon atoms, especially methyl groups. The second category includes compounds in which $R_1$ and $R_2$ and/or $R_3$ and $R_4$ can be joined to form a 5 or 6 membered heterocyclic ring in which one carbon atom can be replaced by one oxygen atom or one sulfur atom. Representative compounds include 1,8-bis(1-piperidinyl)naphthalene, 1,8-bis(-dimorpholino)naphthalene, 1,8-bis(1-thiazolidinyl)naphthalene, 1,8-bis(1-pyrrolidinyl)naphthalene and 1-dimethylamino-8-morpholinonaphthalene. A third category includes compounds in which $R_1$ and $R_3$ and/or $R_2$ and $R_4$ can be joined to form a heterocyclic ring of 6-20 carbon atoms one of which may be replaced by an oxygen atom, or a sulfur atom. Representative compounds include 9,9-dimethylnaphtho[1,8-bc]-1,5-diazabicyclo-[3.3.1]nonane, naphtho[1,8-bc]-1,5-diazabicyclo-[3.2.2]nonane, and naphtho[1,8-bc]-1,5-diazabicyclo[3.3.3]undecane.

The amount of N,N,N',N'-tetrasubstituted 1,8-diaminonaphthalene incorporated in the fluoroelastomer composition is from about 0.05-2 parts per 100 parts fluoroelastomer and, generally, from about 0.1-1 part per 100 parts fluoroelastomer.

The N,N,N',N'-tetrasubstituted 1,8-diaminonaphthalene can be mixed with the tetrafluoroethylene-containing fluoroelastomer, before or after the addition of curing additives or fillers or at the time such components are added to the composition, on a two-roll rubber mill or in a Banbury mixer or the like. Mixing can be conducted at ambient temperatures, although temperatures up to 100° C. can be used. Usually the aromatic diamine is added with the compounding ingredients at ambient temperature.

The fluoroelastomers used in the present invention contain on a molar basis 30-80 mole % units of tetrafluoroethylene, 20-40 mole % units of perfluoroalkyl perfluorovinyl ether, up to 3 mole % units of a bromine-containing olefin and, optionally up to 40 mole % units of ethylene. Usually the alkyl group in the perfluoroalkyl perfluorovinyl ether contains 1-5 carbon atoms. It should also be mentioned that the fluoroelastomer can contain up to about 5 mole % of a perfluoroalkoxyalkyl vinyl ether to improve the low temperature properties of the polymer. Representative perfluoroalkoxyalkyl vinyl ethers that can be added to the reaction mixture include perfluoro(2-n-propoxypropyl vinyl ether), perfluoro(3-methoxypropylvinyl ether), perfluoro(2-methoxypropyl vinyl ether) and perfluoro(2-methoxyethyl vinyl ether). One preferred fluoroelastomer used in the present invention contains 60-80 mole %, most preferably 65-72 mole %, units of tetrafluoroethylene; 20-40 mole %, most preferably 28-35 mole %, units of perfluoroalkyl perfluorovinyl ether; and 0.2-3 mole %, most preferably 0.5-1.5 mole %, units of a bromine-containing olefin. Another preferred fluoroelastomer used in the present invention contains 10-40 mole %, most preferably 20-35 mole %, units of ethylene; 30-60 mole %, most preferably 30-55 mole %, units of tetrafluoroethylene; 20-40 mole %, most preferably 24-35 mole %, units of perfluoroalkyl perfluorovinyl ether; and 0.2-3 mole %, most preferably 0.5-1.5 mole %, units of a bromine-containing olefin. The fluoroelastomers used in this invention contain as cure sites units derived from a bromine-containing olefin. The term "bromine-containing olefin" as used herein means an olefin in which at least one hydrogen atom has been replaced with a bromine atom and, optionally, one or more of the remaining hydrogen atoms have been replaced with an atom of another halogen, preferably fluorine. Some compounds of this type are available commercially and others can be prepared by methods known in the art, for example, as shown by Tarrant and Tandon, J. Org. Chem. 34, 864 (1969) and by Fainberg and Miller, 79 JACS 4170 (1957) and J. Org. Chem. 42 1985-90 (1977). Representative bromine-containing olefins which are copolymerizable with the monomers used to form the fluoroelastomer include bromotrifluoroethylene, 1-bromo-2,2-difluoroethylene, 4-bromo-3,3,4,4-tetrafluorobutene-1, vinyl bromide, 1-bromo-2,2-difluoroethylene, perfluoroallyl bromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromo-perfluorobutene-1 and 3,3-difluoroallylbromide. It is preferable to use sufficient units of the brominated olefin to provide at least 0.05 weight percent bromine, usually about 0.3-1.5 weight percent bromine, in the tetrafluoroethylene-containing fluoroelastomer. The fluoroelastomers contain up to 3 mole percent, based on the total moles of the fluoroelastomer, of units derived from the bromine-containing olefin, usually at least about 0.2 mole percent. Bromine-containing fluoroelastomers used in the process of this invention are further described in U.S. Pat. No. 4,214,060, the disclosure of which is incorporated herein by reference.

The fluoroelastomers of this invention are prepared by polymerizing a bromine-containing olefin monomer, tetrafluoroethylene, perfluoroalkyl perfluorovinyl ether, and optionally ethylene monomers by emulsion processes in which all the monomers are continuously added to the reactor in much the same manner, and under substantially the same conditions, as described in Apotheker et al. U.S. Pat. No. 4,035,565, especially Example 1. For further details on such emulsion polymerization processes see also Moore U.S. Pat. No. 3,839,305 and Gladding et al. U.S. Pat. No. 3,707,529.

In preparing the fluoroelastomer to be used in the present invention, it is preferred that the reaction mixture of monomer components also contains a free-radical initiator, and the polymer-forming reaction is carried out as a free-radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as ammonium perfluorooctanoate. The surfactant can be selected from those known to be useful in the manufacture of fluoroelastomers. A surfactant can, of course, also be present when using an inorganic initiator. Optionally, a known chain transfer agent can be present during the emulsion polymerization reaction. Examples of such chain transfer agents include diiodomethane, isopropanol, diethyl malonate, methylene bromide, dodecyl mercaptan and methyl acetate.

After completion of the preferred emulsion polymerization reaction, the fluoroelastomer can be isolated from the resulting polymer latex by known methods, for example, by coagulation by adding an electrolyte or by freezing, followed by centrifuging or filtering and then drying the fluoroelastomer.

The polymer-forming reaction can also be carried out in bulk, or in an organic liquid containing an organic free-radical initiator.

During preparation of the fluoroelastomer, the reaction mixture is preferably heated in a reactor which has been flushed with an inert gas at about 40°–130° C. under superatmospheric pressure, for example, under a pressure of about 0.7–14 MPa, preferably about 3–10 MPa. In some of the most useful procedures, the polymerization is carried out as a continuous process and the reaction mixture has an average residence time in the reactor of about 0.5 to 5 hours. Residence time can be calculated by dividing the reactor volume by the volume of latex produced per hour.

The fluoroelastomer in the majority of cases will have an inherent viscosity of about 0.2 dl/g or higher, with special preference for an inherent viscosity of about 0.3–1 dl/g. Inherent viscosities of the fluoroelastomers can be measured at 30° C. at a fluoroelastomer concentration of 0.2% by weight in a solvent consisting of 60/40/3 volume ratio of heptafluoro-2,3,3-trichlorobutane, perfluoro(butyltetrafluorohydrofuran) and ethylene glycol dimethyl ether.

Optionally, at least one metal compound selected from divalent metal oxides or divalent metal hydroxides is frequently blended with the fluoroelastomer during preparation or before it is cured. These metal compounds absorb certain gases and acidic materials which are evolved during vulcanization that can chemically attack and weaken the fluoroelastomer. The presence of such compounds improves the heat aging resistance and thermal stability of the polymer. Representative metal compounds include the oxides and hydroxides of magnesium, zinc, calcium, or lead. A metal salt of a weak acid can be used along with the oxide and/or hydroxide. Representative metal salts of weak acids include barium-, sodium-, potassium-, lead- and calcium-/-stearate, -benzoate, -carbonate, -oxalate and -phosphite. Lead oxide is especially preferred. The metal compound is added to the fluoroelastomer in an amount equal to about 1–15%, preferably about 2–10%, by weight of the fluoroelastomer. Another advantage of the present invention is that less than the usual amounts of these acid acceptors, e.g., 0.5–2% by weight of the fluoroelastomer, can be used due to the strong basicity of the N,N,N',N'-tetrasubstituted 1,8-diaminonaphthalenes. Metal compounds that are useful are further described by Bowman in U.S. Pat. No. 3,686,143.

The addition of conventional coagents that are polyunsaturated compounds and cooperate with the peroxide curative to provide a useful cure can be added to the fluoroelastomer composition to increase its cure rate. The amount of coagent added to the composition is, generally, between about 0.25–10, usually 0.5–5, parts per 100 parts fluoroelastomer. Representative coagents that are especially effective include triallyl isocyanurate, triallyl cyanurate, trivinyl isocyanurate and trimethallyl isocyanurate.

In preparing the present fluoroelastomer composition, exclusive of peroxide curative, one can mix the fluoroelastomer with the N,N,N',N'-tetrasubstituted 1,8-diaminonaphthalene, described hereinabove, and other ingredients, e.g. fillers, by means of any mixing apparatus known to be useful for preparing rubber or plastic compositions; for example, one can use a roller-type rubber mill equipped to operate at a temperature below the decomposition temperature of the fluoroelastomer composition.

The resulting fluoroelastomer composition containing the N,N,N',N'-tetrasubstituted 1,8-diaminonaphthalene can be cured by mixing the tetrafluoroethylene-containing fluoroelastomer composition with an organic peroxide curing agent by any conventional means. Any organic peroxide whose decomposition temperature is higher than the mixing temperature can be used to cure the fluoroelastomer composition containing the aromatic diamine. Preferably a dialkyl peroxide curative is used. An organic peroxide curative is selected which will function as a curing agent for the composition in the presence of the other ingredients which are present in the end-use fluoroelastomer composition and under the temperatures used in the curing operation without causing any harmful amount of curing during mixing or other operations which precede the curing operation. A dialkyl peroxide which decomposes at a temperature above about 100° C. is especially preferred. In many cases one will prefer to use a di-tertiarybutyl peroxide having a tertiary carbon atom attached to a peroxy oxygen to cure the fluoroelastomer. Among the most useful peroxides of this type are 2,5-dimethyl-2,5-di(tertiarybutylperoxy)hexyne-3 and 2,5-dimethyl-2,5-di(tertiarybutylperoxy)hexane. Other representative peroxides that can be used include dicumyl peroxide, dibenzoyl peroxide, tertiary butyl perbenzoate, ethyl-3,3-di(t-butylperoxy)butyrate, 1,1-bis(t-butylperoxy)-3,3,5-trimethylcyclohexane and the like.

The peroxide curing agent can be added to the fluoroelastomer in amounts of from about 0.5–10% based on the weight of the fluoroelastomer. One will usually prefer to employ a peroxide in an amount of about 1.5–5% based on the weight of the fluoroelastomer.

The fluoroelastomer composition can also contain one or more additives such as those known to be useful in fluoroelastomer compositions, for example, pigments, fillers and pore-forming agents.

The composition can be cured by subjecting it to conditions which result in the decomposition of the organic peroxide, for example, by heating the composition at a temperature which causes the peroxide to decompose. The initial curing of the fluoroelastomer composition in most cases is preferably carried out by heating the composition in a mold cavity for about 1–60 minutes at about 150°–210° C. Conventional rubber- and plastic-curing compression, injection, or extrusion type molds are used wherein the metal mold cavity, usually made of steel, is provided with suitable heating and curing means. The tetrafluoroethylene-containing fluoroelastomer composition containing a brominated cure-site and formed into a particular shape in the mold cavity does not stick to the mold cavity after it is cured and it can be cleanly removed therefrom. Prior to the present invention care had to be used in removing the cured article from the mold cavity because the shaped article would tenaciously stick to the metal walls and, frequently, the article would be damaged by tearing upon removal. Equally important is the fact that the N,N,N',N'-tetrasubstituted 1,8-diaminonaphthalenes do not adversely affect the important physical properties of the tetrafluoroethylene-containing fluoroelastomer vulcanizes, e.g., compression set resistance, tensile strength and elongation at break, in spite of the fact that amines frequently cause a severe deterioration of the tensile strength of fluoroelatomers.

Most often one wants a product having maximum heat resistance and dimensional stability. Therefore, after the shaped article is removed from the mold cavity, a post-curing operation is conducted wherein the article is heated in an oven or the like for about 1–48 hours at about 180°–300° C. One skilled in the art will realize that the best curing time and temperature for a particular application will depend on such factors as the nature and proportion of ingredients and the properties needed in the final product.

Tetrafluoroethylene-containing fluoroelastomer compositions of the present invention can be easily made in vulcanizable grades suitable for compounding and curing by practical and economical methods to yield highly useful cured elastomer articles for applications such as gaskets, O-rings, hoses, seals and the like, which have good creep-resistance and good resistance to damage by heat, solvents and corrosive chemicals. Most importantly, the fluoroelastomer compositions of the present invention give vulcanizates that are easily removable from a metal mold cavity without tearing the shaped article.

The following examples illustrate preferred embodiments of the invention.

EXAMPLE 1

An elastomeric copolymer of tetrafluoroethylene, perfluoromethyl perfluorovinyl ether and 4-bromo-3,3,4,4-tetrafluorobutene-1 is prepared by a continuous process as follows:

Continuously feeding the three monomers at a rate of 135 g/h tetrafluoroethylene, 160 g/h perfluoromethyl perfluorovinyl ether and 3.6 g/h of 4-bromo-3,3,4,4-tetrafluorobutene-1 to a 4.04 liter stainless steel pressure vessel reactor (polymerization reaction zone) which had been flushed with nitrogen while operating the stirrer of the reactor at 1000 rpm for thorough mixing of the reactor contents, and heating the reaction mixture at 70° C. under a pressure of 4.2 MPa so that the reaction mixture will undergo an emulsion polymerization reaction as it passes through the reactor. The reactor residence time is about 4 hours based on the ratio of the 4.04 liter reactor to the emulsion output rate of about 1.0 liters per hour. At the same time, constantly feeding to the reactor through a first metering pump during each hour 500 ml of a solution composed of 5.6 grams of dibasic sodium phosphate heptahydrate, and 18.8 grams of ammonium perfluorooctanoate and 2.75 grams of ammonium persulfate dissolved in 1000 ml. of water (distilled), and simultaneously feeding to the reactor through a second metering pump during each hour 500 ml of a solution composed of 2.25 grams of sodium sulfite dissolved in 1000 ml. of water. The reaction mixture is maintained at a pH of 6.4. The conversion to polymer was about 63%. The resulting copolymer latex that is formed is continuously recovered.

The copolymer is isolated from the latex by heating to 90° C. and gradually adding an aqueous solution of magnesium sulfate until the copolymer is coagulated. The resulting copolymer particles are washed with distilled water and the water is removed by filtration. The copolymer is dried in an oven at 70° C. to a moisture content of less than 1%. The resulting tetrafluoroethylene-containing fluoroelastomer contains 55.3 wt % (67.4 mole %) units of tetrafluoroethylene, 43.5 wt % (31.9 mole %) units of perfluoromethyl perfluorovinyl ether and 1.2 wt % (0.7 mole %) units of 4-bromo-3,3,4,4-tetrafluorobutene-1.

Preparation of Fluoroelastomer Compositions

A fluoroelastomer composition was prepared by mixing the following ingredients on a two-roll rubber mill whose rolls are at about 100°–120° C.: 100 parts of the fluoroelastomer of Example 1 described above, 10 parts of SAF carbon black, 3 parts lead oxide, 4 parts triallyl isocyanurate, 0.3 parts 18-crown-6 (1,4,7,10,13,16-hexaoxacyclooctadecane), 5.5 parts Luperco 101XL peroxide curing agent (45% of 2,5-dimethyl-2,5-di(t-butylperoxy)hexane and 55% inert filler) and 0.5 parts of the aromatic diamine 1,8-bis(dimethylamino)naphthalene. A control sample was prepared in the same manner using the same ingredients mentioned above except that the aromatic diamine 1,8-bis(dimethylamino)naphthalene was omitted from the formulation.

Physical Properties of Fluoroelastomer Compositions

To determine if there are any detrimental effects on the physical properties of the fluoroelastomer composition due to the addition of 1,8-bis(dimethylamino)naphthalene the following tests were performed. Cure properties of samples of the fluoroelastomer containing the aromatic diamine and the fluoroelastomer used in the control experiment were measured with an oscillating disk rheometer (ODR) at a cure time of 30 minutes and a cure temperature of 177° C., according to ASTM D-2084. Table I shows the value of $t_c90$, i.e. the time in minutes required to reach 90% of the cure state reached in 30 minutes. Test samples of the above described tetrafluoroethylene-containing fluoroelastomers were press-cured in an electrically heated press for 15 minutes at 190° C. at a pressure of 200 MPa and post-cured in an oven under nitrogen during a cycle of: 6 hours to reach 204° C., 18 hours at 204° C., 6 hours to reach 288° C. and 18 hours at 288° C. Stress/strain properties of: tensile at break ($T_B$), 100% modulus ($M_{100}$), and elongation at break ($E_B$) were determined according to ASTM D-412. Compression set values of the samples were determined using ASTM D-395. The results of these tests are shown in Table I.

TABLE I

| Ingredients | Example 1 | Control |
|---|---|---|
| Fluoroelastomer | 100 | 100 |
| SAF Carbon Black | 10 | 10 |
| PbO | 3 | 3 |
| Triallyl Isocyanurate | 4 | 4 |
| 18-Crown-6 | 0.3 | 0.3 |
| Luperco ® 101XL Curing Agent | 5.5 | 5.5 |
| 1,8-bis(dimethylamino)-naphthalene | 0.5 | — |
| ODR-177° C./30 minutes | | |
| $t_c90$ (minutes) | 3.8 | 3.3 |
| Stress/Strain Properties | | |
| $M_{100}$ (MPa) | 15.9 | 10.3 |
| $T_B$ (MPa) | 15.9 | 15.9 |
| $E_B$ (%) | 100 | 170 |
| Compression Set Resistance 70 hours/200° C. (%) | | |
| Pellets | 68 | 87 |
| O-rings | 70 | 91 |

The data given in Table I show that the addition of the aromatic diamine 1,8-bis(dimethylamino)naphthalene to the fluoroelastomer does not detrimentally affect the important physical properties of the fluoroelastomer composition.

Improvement in Demolding

The following test measures the adhesive forces between a metal surface typical of that used in a mold cavity and the cured fluoroelastomer compositions of Example 1 and the Control experiment. This test has been found to provide a quantitative value which correlates inversely with the ease of demoldability of the fluoroelastomer composition from a metal mold cavity, i.e., a high test value indicates the composition is difficult to remove from the mold cavity.

An Instron testing machine is used to measure the amount of force in psi required to pull a 1 in. (2.5 cm) wide stainless steel strip from the center of $1 \times 3 \times \frac{1}{4}$ in. (2.5×7.6×0.6 cm) rectangular fluoroelastomer composition, described hereinabove, that are formed into compression-molded slabs into which the stainless steel strip is embedded to a depth of 1 in. (2.5 cm). The test sample is prepared by making a 1 in. (2.5 cm) deep slit in a $1 \times 3 \times 174$ in. (2.5×7.6×0.6 cm) rectangular sample of the uncured fluoroelastomer such that the slit is parallel to the 3 in. (7.6 cm) face, runs across the entire width of the sample and is positioned equidistant between the two 3-inch faces of the sample. A $1 \times 4 \times \frac{1}{8}$ in. (2.5×10.2×0.3 cm) stainless steel strip is inserted into the slit. Spacers consisting of $1 \times 3 \times 1/16$ in. (2.5×7.6×.16 cm) steel strips are placed above and below the stainless steel strip abutting the fluoroelastomer composition to maintain the proper configuration. The assembly is then subjected to a 15-minute press cure at 177° C. in a hydraulic press. The force required to remove the stainless steel strip from the cured polymer is determined with an Instron testing machine at 177° C. and a crosshead speed of 0.5 inches/min. (1.3 cm/min.). Since both sides of the 1 sq. inch embedded stainless steel strip contribute to the tangential demolding force, $2 \times F_{tan}$ (where F is force in pounds per square inch, tan is tangent) is the quantity measured. Four determinations were made for each sample. Mean values of $2 \times F_{tan}$ and standard deviations are shown in Table II.

TABLE II

| Mold Sticking Force | Example I | Control |
|---|---|---|
| $2 \times F_{tan}$ (psi) | 21.8 | 46.4 |
| Mean Standard Deviation | 4 | 9 |

The results given in Table II quantitatively show that substantially less force is required to separate the fluoroelastomer rubber vulcanizate containing the aromatic diamine from the steel strip than is required to remove the control sample.

EXAMPLE 2

A continuous emulsion polymerization was carried out in a well-stirred 4 liter stainless steel reaction vessel. The reactor was filled with an aqueous solution containing 2.5 g ammonium persulfate (APS) initiator, 16.67 g disodium hydrogen phosphate heptahydrate buffer and 2.67 g ammonium perfluorooctanoate soap per liter of deionized water. The reactor was heated to 90° C. and the aqueous solution was metered in at a rate of 1.20 l/h. The reactor was kept liquid-full at 6.3 MPa by means of a back-pressure control valve in the effluent line. After one hour the polymerization reaction was started by introducing a gaseous monomer mixture consisting of tetrafluoroethylene, perfluoromethyl perfluorovinyl ether and ethylene in a weight ratio of 42.8/52.3/4.9 which was fed through a diaphragm compressor at 462.3 g/h. After 0.5 hr, 4-bromo-3,3,4,4-tetrafluorobutene-1 was introduced at a rate of 6.2 g/h, metered as 7.6 ml/h of a 50 vol % solution in t-butanol.

The polymer latex effluent was separated from residual monomers in a degassing vessel at atmospheric pressure. Monomer offgas flow was measured at 113.0 g/h and had a composition of 0.01 weight % ethylene, 16.6 weight % tetrafluoroethylene and 83.4 weight % perfluoromethyl perfluorovinyl ether after the reactor had equilibrated for five hours. The tetrafluoroethylene-containing fluoroelastomer had the following composition:

TABLE III

| Monomer | Incorporated in Polymer | |
|---|---|---|
| | wt % | Mole % |
| Ethylene | 6.4 | 22.9 |
| Tetrafluoroethylene | 50.5 | 51.0 |
| Perfluoromethyl perfluoro vinyl ether | 41.5 | 25.3 |
| 4-bromo-3,3,4,4-tetra-fluorobutene-1 | 1.6 | 0.8 |

The fluoroelastomer was isolated from the latex by reducing the pH to about 3 with dilute nitric acid and coagulating with a calcium nitrate solution. The coagulated polymer was allowed to settle and was washed by reslurrying in water twice and filtering. The wet crumb was dried in an air oven at 50°-60° C. to a moisture content of less than 1%.

Preparation of Fluoroelastomer Compositions

A fluoroelastomer composition was prepared by mixing the following ingredients on a two-roll rubber mill whose rolls were heated to about 30° C.: 100 parts fluoroelastomer of Example 2, 30 parts MT carbon black, 3 parts lead oxide, 3 parts trimethallyl isocyanurate, 5 parts Luperco ® 101-XL peroxide curing agent, 0.5 part of the aromatic diamine 1,8-bis(dimethylamino)-naphthalene and 1 part processing aid (75% tetramethylene sulfone, 25% inert support). A Control experiment was conducted with 100 parts of the fluoroelastomer of Example 2 and containing the same ingredients as described above, except the composition did not contain the aromatic diamine additive 1,8-bis(dimethylamino)naphthalene.

Physical Properties of Fluroelastomer Compositions

To determine if there are any detrimental effects on the physical properties of fluoroelastomer composition due to the addition of 1,8-bis(dimethylamino)naphthalene the following tests were performed. Cure properties of samples of the fluoroelastomer compositions were measured with an oscillating disk rheometer (ODR) at a cure time of 30 minutes and a cure temperature of 177° C., according to ASTM D-2084. Table IV shows the value of $t_c 90$, i.e., the time in minutes required to reach 90% of the cure state reached in 30 minutes. Test samples of the fluoroelastomer composition described above were press-cured in an electrically heated press for 15 minutes at 177° C. and post-cured in a circulating air oven at 232° C. for 24 hours. Compression set values of the samples were determined using ASTM D-395. Stress/strain properties of: tensile at break ($T_B$) 100% modulus ($M_{100}$), and elongation at break ($E_B$) were determined according to ASTM D-412. Compression set values of the samples were determined using ASTM D-395. The results of these tests are shown in Table IV.

TABLE IV

| Ingredients | Fluoroelastomer Composition | Control |
|---|---|---|
| Fluoroelastomer | 100 | 100 |
| MT Carbon Black | 30 | 30 |
| PbO | 3 | 3 |
| Trimethallyl Isocyanurate | 3 | 3 |
| Luperco ® 101-XL | 5 | 5 |
| 1,8-bis(dimethyl-amino)naphthalene | 0.5 | — |
| Processing Aid | 1 | 1 |
| ODR 177° C./30 Minutes | | |
| $t_c 90$ (minutes) | 10.5 | 11.7 |
| Stress/Strain Properties | | |
| $M_{100}$ (MPa) | 13.5 | 10.0 |
| $T_B$ (MPa) | 14.7 | 16.1 |
| $E_B$ (%) | 105 | 145 |
| Compression Set Resistance | | |
| 70 hrs/100° C. (%) | 41 | 44 |

The results given in Table IV show that addition of 1,8-bis(dimethylamino)naphthalene does not adversely affect physical properties of the fluoroelastomer.

Improvement in Demolding

The procedure described above in Example 1 for measuring the adhesive forces between a metal surface typical of that used in a mold cavity and the cured fluoroelastomer compositions were reported for the composition of Example 2 and the Control. Four determinations were made for each sample of the fluoroelastomer compositions described above in Table IV. Mean values of $2 \times F_{tan}$ (psi) and standard deviations are shown in Table V below.

TABLE V

| Mold Sticking Force | Fluoroelastomer Composition | Control |
|---|---|---|
| $2 \times F_{tan}$ (psi) | 14 | 29 |
| Mean Standard Deviation | 3 | 3 |

The results given in Table V quantitatively show that substantially less force is required to separate the fluoroelastomer vulcanizate containing the aromatic diamine from the steel strip than is required to remove the control sample.

I claim:

1. A peroxide-curable fluoroelastomer composition which comprises
   (a) a fluoroelastomer whose interpolymerized units consist essentially of units of tetrafluoroethylene, units of perfluoroalkyl perfluorovinyl ether, units of a bromine-containing olefin and, optionally, units of ethylene, and
   (b) from about 0.05-2 parts per 100 parts fluoroelastomer of an N,N,N',N'-tetrasubstituted 1,8-diaminonaphthalene having the formula:

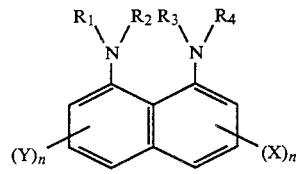

wherein $R_1$, $R_2$, $R_3$ and $R_4$ are independently alkyl groups of 1-6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6-20 carbon atoms in which a carbon atom can be replaced by an oxygen or a sulfur atom, X and Y are independently an alkyl group or an alkoxy group containing 1-4 carbon atoms and n is 0-3.

2. A peroxide-curable fluoroelastomer composition of claim 1 wherein $R_1$, $R_2$, $R_3$ and $R_4$ are independently alkyl groups of 1-6 carbon atoms.

3. A peroxide-curable fluoroelastomer composition of claim 1 wherein $R_1$, $R_2$, $R_3$ and $R_4$ are methyl groups.

4. A peroxide-curable fluoroelastomer composition of claim 1 wherein the fluoroelastomer contains from about 30-80 mole % units of tetrafluoroethylene, 20-40 mole % units of perfluoroalkyl perfluorovinyl ether, up to 3 mole % of units from a bromine-containing olefin and, optionally, up to 40 mole % units of ethylene.

5. A peroxide-curable fluoroelastomer composition of claim 1 wherein the fluoroelastomer contains from about 60-80 mole % units of tetrafluoroethylene, 20-40 mole % units of perfluoromethyl perfluorovinyl ether and 0.2–3 mole % of units of a bromine-containing olefin.

6. A peroxide-curable composition of claim 5 wherein $R_1$, $R_2$, $R_3$ and $R_4$ are methyl.

7. A peroxide-curable fluoroelastomer composition of claim 6 wherein the units of the bromine-containing olefin are from 4-bromo-3,3,4,4-tetrafluorobutene-1.

8. A peroxide-curable fluoroelastomer composition of claim 1 wherein the fluoroelastomer contains from about 30–60 mole % units of tetrafluoroethylene, 20–40 mole % units of perfluoroalkyl perfluorovinyl ether, 10–40 mole % units of ethylene and up to 3 mole % of units from a bromine-containing olefin.

9. A peroxide-curable fluoroelastomer composition of claim 8 wherein $R_1$, $R_2$, $R_3$ and $R_4$ are methyl.

10. A peroxide-curable fluoroelastomer composition of claim 9 wherein units of the bromine-containing olefin are from 4-bromo-3,3,4,4-tetrafluorobutene-1.

11. A peroxide-curable fluoroelastomer composition of claim 1 which also contains 1–15 mole %, based on the weight of the fluoroelastomer, of a metal compound that is a divalent metal oxide or hydroxide.

12. A peroxide-curable fluoroelastomer composition of claim 1 which also contains 0.25–10 parts per 100 parts fluoroelastomer of a coagent that is a polyunsaturated compound.

13. A peroxide-curable fluoroelastomer composition of claim 1 which also contains about 0.5–10%, based on the weight of the fluoroelastomer, of an organic peroxide curing agent.

* * * * *